United States Patent
Gao et al.

(10) Patent No.: US 10,460,180 B2
(45) Date of Patent: Oct. 29, 2019

(54) SYSTEMS AND METHODS FOR VISUAL CLASSIFICATION WITH REGION PROPOSALS

(71) Applicant: GM GLOBAL TECHNOLOGY OPERATIONS LLC, Detroit, MI (US)

(72) Inventors: Peter Gao, San Francisco, CA (US); Wei Mou, San Bruno, CA (US); Siddhartho Bhattacharya, San Jose, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 15/492,760

(22) Filed: Apr. 20, 2017

(65) Prior Publication Data

US 2017/0220876 A1    Aug. 3, 2017

(51) Int. Cl.
*G06K 9/00* (2006.01)
*G06K 9/32* (2006.01)
*G06K 9/62* (2006.01)

(52) U.S. Cl.
CPC ....... *G06K 9/00805* (2013.01); *G06K 9/3241* (2013.01); *G06K 9/627* (2013.01); *G06K 2209/40* (2013.01)

(58) Field of Classification Search
None
See application file for complete search history.

(56) References Cited

U.S. PATENT DOCUMENTS

| | | | | |
|---|---|---|---|---|
| 9,229,453 | B1* | 1/2016 | Lee | G05D 1/0214 |
| 2012/0224060 | A1* | 9/2012 | Gurevich | B60R 1/00 |
| | | | | 348/148 |
| 2013/0342658 | A1* | 12/2013 | Kuhn | G06T 5/50 |
| | | | | 348/47 |
| 2016/0132734 | A1* | 5/2016 | Lee | G06K 9/00805 |
| | | | | 382/104 |
| 2016/0231746 | A1* | 8/2016 | Hazelton | G05D 1/0257 |
| 2017/0113664 | A1* | 4/2017 | Nix | B60T 7/12 |
| 2017/0270899 | A1* | 9/2017 | Sato | G06F 3/013 |
| 2018/0056996 | A1* | 3/2018 | Lee | B60T 8/17557 |
| 2018/0204076 | A1* | 7/2018 | Tripathi | G06K 9/4647 |
| 2018/0211403 | A1* | 7/2018 | Hotson | G06K 9/4604 |
| 2019/0026572 | A1* | 1/2019 | Theodosis | G06K 9/00812 |

* cited by examiner

*Primary Examiner* — Ricky Chin
(74) *Attorney, Agent, or Firm* — Lorenz & Kopf, LLP

(57) ABSTRACT

Systems and method are provided for controlling an autonomous vehicle. A camera configured to capture an image, and a controller can execute an autonomous driving system (ADS) that classify that image. The ADS comprises a classification system for classifying objects in an environment within a driveable area of the autonomous vehicle. The classification system comprises a processor configured to execute a region proposal generator module and an image classification module. The region proposal generator module generates a set of bounding box region proposals for the image. The bounding box region proposals are selected areas of the image that include objects to be classified. The image classification module classifies, via a neural network executed by the processor, the objects from the image that are within one of the bounding box region proposals.

5 Claims, 7 Drawing Sheets

SYSTEMS AND METHODS FOR VISUAL CLASSIFICATION WITH REGION PROPOSALS

TECHNICAL FIELD

The present disclosure generally relates to autonomous vehicles, and more particularly relates to systems and methods for classifying objects within an image.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Some autonomous vehicles can include systems that use sensor data to classify objects. These systems can identify and classify objects in the surrounding environment including objects located in the vehicle's travel path. In these systems, an entire image obtained from a camera is searched for objects of interest that need to be classified. This approach to object classification is computationally intensive and expensive, which makes it slow and very time consuming and suffers from object detection problems.

Accordingly, it is desirable to provide systems and methods that can speed up the process of classifying objects within an image. Furthermore, other desirable features and characteristics of the present invention will become apparent from the subsequent detailed description and the appended claims, taken in conjunction with the accompanying drawings and the foregoing technical field and background.

SUMMARY

Systems and method are provided for classifying objects in an environment. In accordance with a method, a processor processes ranging information from depth sensors to identify a set of bounding box region proposals for an image from a camera. The ranging information can include radar data from radar devices, and/or point cloud data provided from lidar devices. The bounding box region proposals are selected areas of the image that include objects to be classified. In one embodiment, each of the bounding box region proposals comprises a set of two-dimensional bounding box coordinates that correspond to a region of a rectified image that includes one or more objects to be classified. The set of bounding box region proposals collectively specify which objects are in the rectified image and where those objects are in the rectified image. A neural network executed by the processor can then classify the objects from the image that are within one of the bounding box region proposals. The neural network generates an object classification result for each object from the rectified image that is within one of the bounding box region proposals.

In one embodiment, processing the range information can include generating segmented objects, via a depth sensor processing module executed at the processor, based on the ranging information. The segmented objects define three-dimensional locations and dimensions of objects in vicinity of a vehicle. An object tracking module executed at the processor can determine a subset of segmented objects to be classified, and generate object state information that indicates the three-dimensional locations of the subset of segmented objects to be classified.

In one embodiment, the object state information can be generated based on the segmented objects that are to be classified and regressed bounding boxes that are fed back to the object tracking module. The subset of segmented objects to be classified are those segmented objects that: meet a size constraint, are within a certain height range above the ground and are within a driveable area of the vehicle. Other segmented objects that are not to be classified are those that the vehicle cannot hit and are disregarded when generating the object state information. In one embodiment, the object state information for each object comprises dimensions of that object, and a three-dimensional location of that object with respect to the vehicle that indicates distance of that object from the vehicle.

In one embodiment, region proposal generator module executed at the processor can then process the object state information to generate the set of bounding box region proposals. In one embodiment, an image preprocessing module executed at the processor, can process image data received from cameras to generate rectified images. The region proposal generator module can translate the three-dimensional locations of objects as specified by the object state information into the set of bounding box region proposals. For example, in one implementation, the region proposal generator module can generate bounding box region proposals for each object by projecting the three-dimensional location of that object into one of the rectified images.

In one embodiment, the neural network executed by the processor is a convolutional neural network that is trained on a set of labelled image data to learn characteristics for each type of object. The set of labelled image data includes information that identifies a class of each object and labelled images that are each annotated with a bounding box of that object. When executed by the processor the convolutional neural network only classifies the objects from the rectified image that are within one of the bounding box region proposals, and disregards other objects from the rectified image. As such, only portions of the rectified image that are specified by one of the bounding box region proposals are analyzed to classify objects within the rectified image.

During classification of the objects, a bounding box regression module executed at the processor generates a regressed bounding box for each object that is classified. The regressed bounding box for each object is the bounding box that the neural network has determined to be the best bounding box encompassing that object. The steps described above are performed iteratively such that an object classification result and a regressed bounding box for each object being classified are fed back on each iteration. As such, the bounding box region proposal for each object can be refined during each subsequent iteration so that the bounding box region proposal for each object more closely describes actual geometry of that object.

In another embodiment, a classification system is provided for classifying objects in an environment. The classification system comprises a region proposal generator module and an image classification module. The region proposal generator module, when executed by a processor, can generate a set of bounding box region proposals for an image from a camera. The bounding box region proposals are selected areas of the image that include objects to be classified. The image classification module can classify, via a neural network executed by the processor, the objects from the image that are within one of the bounding box region proposals. In one embodiment, each of the bounding box region proposals comprises a set of two-dimensional bounding box coordinates that correspond to a region of a rectified image that includes one or more objects to be classified. The set of bounding box region proposals collectively specify which objects are in the rectified image and where those objects are in the rectified image.

In one embodiment, the classification system can further include a depth sensor processing module, an object tracking module and an image preprocessing module. The depth sensor processing module generates segmented objects based on ranging information. The segmented objects define three-dimensional locations and dimensions of objects in vicinity of a vehicle. The object tracking module determines a subset of segmented objects to be classified that meet a size constraint based, are within a certain height range above the ground and are within a driveable area of the vehicle. The object tracking module also generates object state information that indicates the three-dimensional locations of the subset of segmented objects with respect to the vehicle. The region proposal generator module processes the object state information to generate the set of bounding box region proposals. The image preprocessing module configured to process image data received from cameras to generate rectified images. The image classification module can classify, via a neural network executed by the processor, only the objects from the rectified image that are within one of the bounding box region proposals, and disregards other objects from the rectified image such that only portions of the rectified image that are specified by one of the bounding box region proposals are analyzed to classify objects within the rectified image.

In another embodiment, an autonomous vehicle is provided that includes a camera configured to capture an image; and a controller configured to execute an autonomous driving system (ADS). The ADS comprises a classification system for classifying objects in an environment within a driveable area of the autonomous vehicle. The classification system comprises a processor configured to execute a region proposal generator module and an image classification module. The region proposal generator module generates a set of bounding box region proposals for the image. The bounding box region proposals are selected areas of the image that include objects to be classified. The image classification module classifies, via a neural network executed by the processor, the objects from the image that are within one of the bounding box region proposals.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
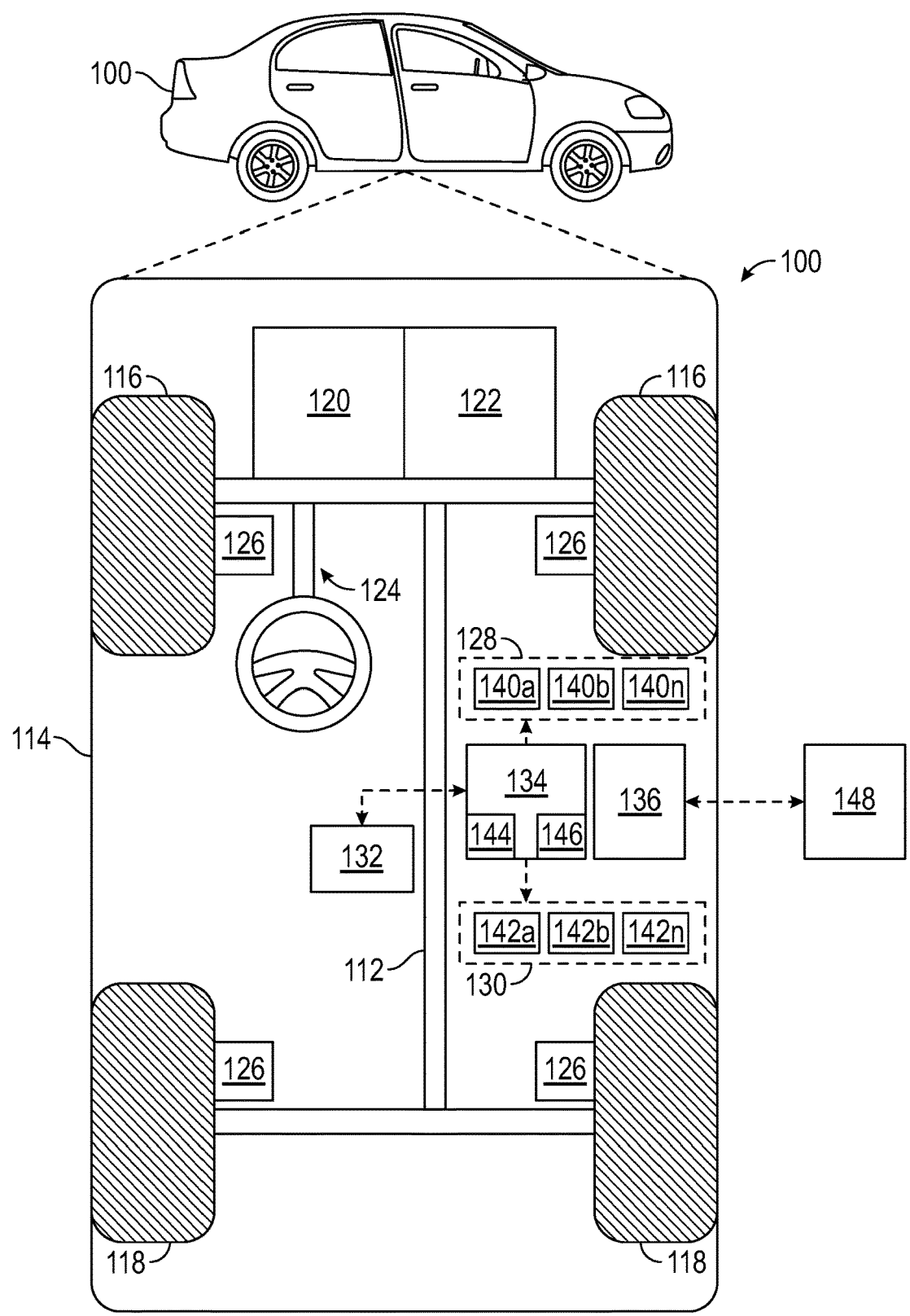
FIG. 1 illustrates a vehicle having a visual classification system in accordance with various embodiments of the present disclosure.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In accordance with the disclosed embodiments, lidar data is used to determine regions where objects are and only objects in those identified regions are classified. Image data for those regions can then be used to determine what the objects are. This approach can speed up the process of classifying objects within an image. For instance, in one embodiment, objects can be classified 10 to 100 times faster than they can in other systems in which the entire image is searched for objects of interest that need to be classified. The disclosed embodiments can save computation resources and time. Classification in the image is beneficial because it has much richer information. Lidar provides information about the shape of the object, but it will be sparse at distance and does not include things like color information. By contrast, camera data is very dense, so even there are a few lidar points on an object, the camera will have enough pixels in that area to confidently classify it.

FIG. 1 illustrates a vehicle having a visual classification system in accordance with various embodiments. As depicted in FIG. 1, the vehicle 100 generally includes a chassis 112, a body 114, front wheels 116, and rear wheels 118. The body 114 is arranged on the chassis 112 and substantially encloses components of the vehicle 100. The body 114 and the chassis 112 may jointly form a frame. The wheels 116-18 are each rotationally coupled to the chassis 112 near a respective corner of the body 114.

In various embodiments, the vehicle 100 is an autonomous vehicle (hereinafter referred to as the autonomous vehicle 100). The autonomous vehicle 100 is, for example, a vehicle that is automatically controlled to carry passengers from one location to another. The vehicle 100 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 100 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver.

As shown, the autonomous vehicle 100 generally includes a propulsion system 120, a transmission system 122, a steering system 124, a brake system 126, a sensor system 128, an actuator system 130, at least one data storage device 132, at least one controller 134, and a communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the vehicle wheels 116-118 according to selectable speed ratios. According to various embodiments, the transmission system 122 may include a step-ratio automatic transmission, a continuously-variable transmission, or other appropriate transmission. The brake system 126 is configured to provide braking torque to the vehicle wheels 116-118. The brake system 126 may, in various embodiments, include friction brakes, brake by wire, a regenerative braking system such as an electric machine, and/or other appropriate braking systems. The steering system 124 influences a position of the of the vehicle wheels 116-118. While depicted as including a steering wheel for illustrative purposes, in some embodiments contemplated within the scope of the present disclosure, the steering system 124 may not include a steering wheel.

The sensor system 128 includes one or more sensing devices 140a-140n that sense observable conditions of the exterior environment and/or the interior environment of the autonomous vehicle 100. The sensing devices 140a-40n can include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as, but not limited to, the propulsion system 120, the transmission system 122, the steering system 124, and the brake system 126. In various embodiments, the vehicle features can further include interior and/or exterior vehicle features such as, but are not limited to, doors, a trunk, and cabin features such as air, music, lighting, etc. (not numbered).

Figure 3:
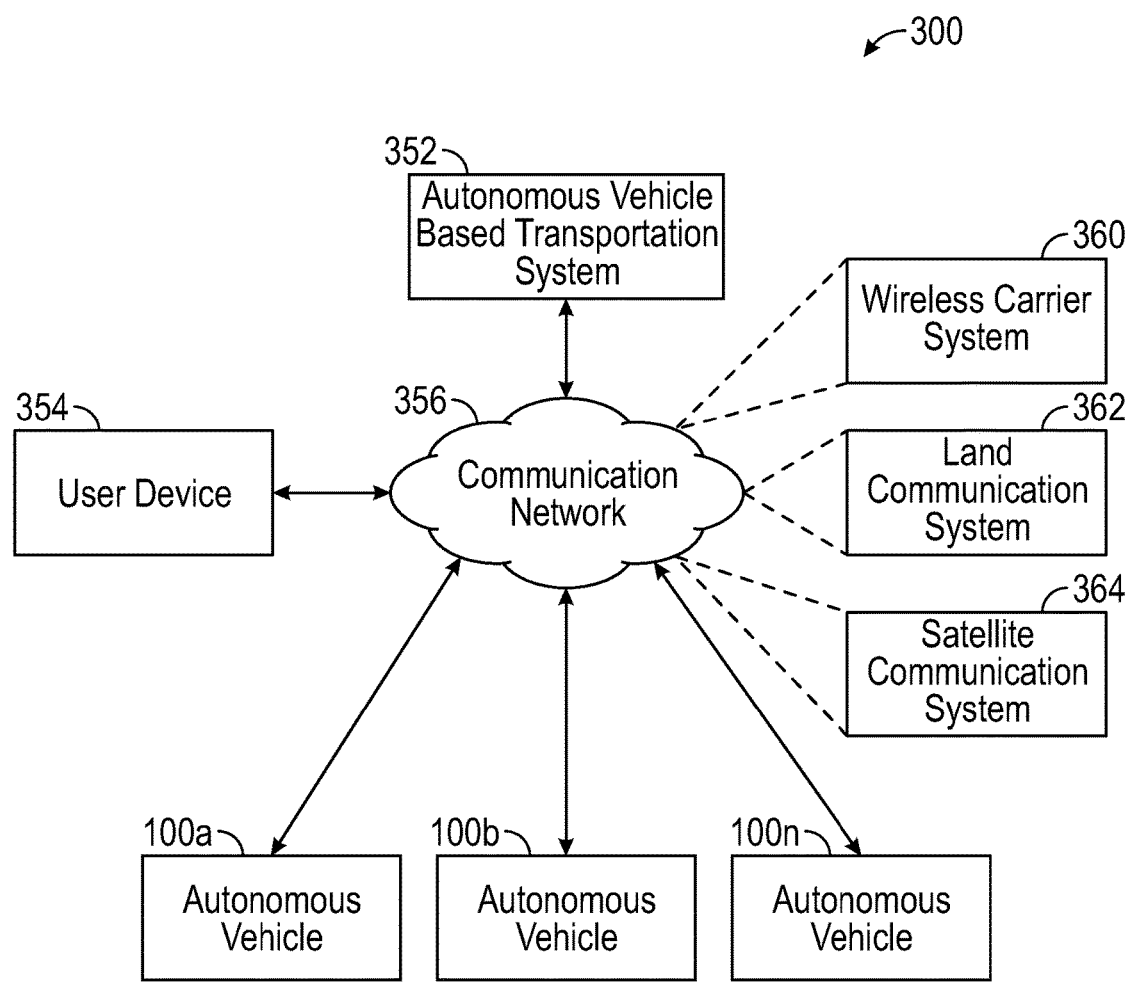
FIG. 3 illustrates an exemplary operating environment that includes an autonomous vehicle based remote transportation system in accordance with various embodiments of the present disclosure.

The communication system 136 is configured to wirelessly communicate information to and from other entities 148, such as but not limited to, other vehicles ("V2V" communication,) infrastructure ("V2I" communication), remote systems, and/or personal devices (described in more detail with regard to FIG. 3). In an exemplary embodiment, the communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 132 stores data for use in automatically controlling the autonomous vehicle 100. In various embodiments, the data storage device 132 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 100 (wirelessly and/or in a wired manner) and stored in the data storage device 132. As can be appreciated, the data storage device 132 may be part of the controller 134, separate from the controller 134, or part of the controller 134 and part of a separate system.

The controller 134 includes at least one processor 144 and a computer readable storage device or media 146. The processor 144 can be any custom made or commercially available processor, a central processing unit (CPU), a graphics processing unit (GPU), an auxiliary processor among several processors associated with the controller 134, a semiconductor based microprocessor (in the form of a microchip or chip set), a macroprocessor, any combination thereof, or generally any device for executing instructions. The computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device or media 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the autonomous vehicle 100.

The instructions may include one or more separate programs, each of which comprises an ordered listing of executable instructions for implementing logical functions. The instructions, when executed by the processor 144, receive and process signals from the sensor system 128, perform logic, calculations, methods and/or algorithms for automatically controlling the components of the autonomous vehicle 100, and generate control signals to the actuator system 130 to automatically control the components of the autonomous vehicle 100 based on the logic, calculations, methods, and/or algorithms. Although only one controller 134 is shown in FIG. 1, embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the autonomous vehicle 100.

In various embodiments, one or more instructions of the controller 134 are embodied in an automated driving system (ADS) for automatically controlling various actuators in the vehicle. In an exemplary embodiment, the ADS is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS is configured to control the propulsion system 120, transmission system 122, steering system 124, and braking system 126 to control vehicle acceleration, steering, and braking, respectively, without human intervention via a plurality of actuators 130 in response to inputs from the sensors of the sensor system 128, which may include GPS, RADAR, lidar, optical cameras, thermal cameras, ultrasonic sensors, and/or additional sensors as appropriate. In various embodiments, one or more instructions of the controller 134 are embodied in the ADS and, when executed by the processor 144, can classify objects in an environment within a driveable area of the autonomous vehicle. For example, the instructions can be used to generate set of bounding box region proposals for an image. The bounding box region proposals are selected areas of the image that include objects to be classified. Objects from the image that are within one of the bounding box region proposals can then be classified via a neural network executed by a GPU.

Figure 2:
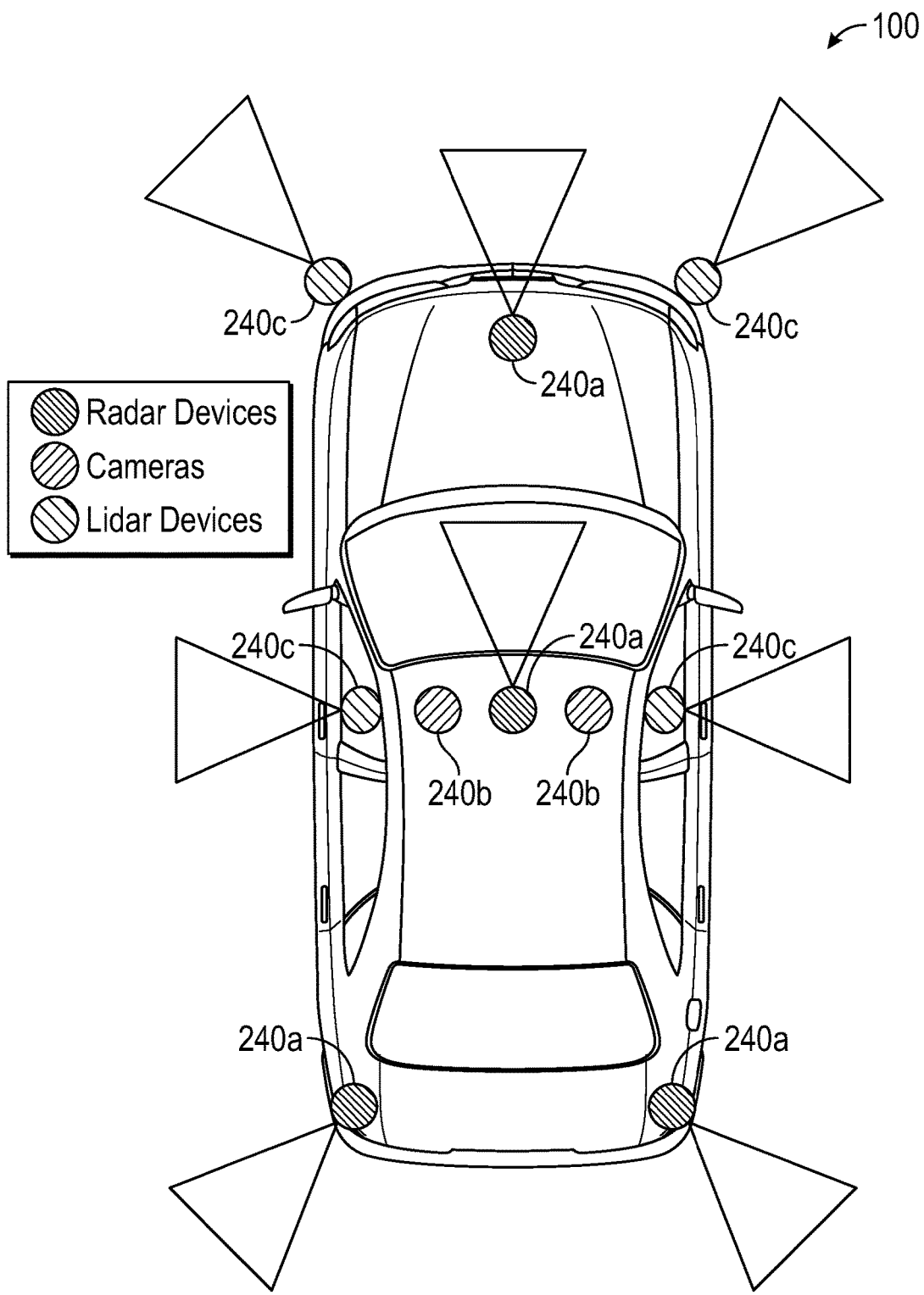
FIG. 2 depicts an exemplary vehicle that includes a plurality of radar devices, cameras, and lidar devices that are distributed about the vehicle in accordance with various embodiments of the present disclosure.

FIG. 2 depicts an exemplary vehicle 100 that includes a plurality of radar devices 240a distributed about the vehicle 100, a plurality of cameras 240b distributed about the vehicle 100 and a plurality of lidar devices 240c distributed about the vehicle 100.

The radar devices 240a are disposed at different locations of the vehicle 100, and in one embodiment, are disposed symmetrically about the longitudinal axis of the vehicle 100 to achieve parallax. Each of the radar devices 240a may include or incorporate components suitably configured to horizontally and rotatably scan the environment to generate radar data that is consumed by other systems. The radar devices 240a output raw point clouds. The point clouds can be used along with the vehicle's speed information and knowledge of the radar's orientation to determine which of the points to keep (e.g., moving things) and which to discard (e.g., noise, stationary objects).

The cameras 240b are also disposed at different locations and oriented to provide different field of views that capture different portions of the surrounding environment in the vicinity of the vehicle 100. For example, a first camera 240b is positioned at the front left (or driver) side of the vehicle 100 and has its field of view oriented 45° counterclockwise relative to the longitudinal axis of the vehicle 100 in the forward direction, and another camera 240b may be positioned at the front right (or passenger) side of the vehicle 100 and has its field of view oriented 45° clockwise relative to the longitudinal axis of the vehicle 100. Additional cameras 240b are positioned at the rear left and right sides of the vehicle 100 and similarly oriented away from the longitudinal axis at 45° relative to the vehicle longitudinal axis, along with cameras 240b positioned on the left and right sides of the vehicle 100 and oriented away from the longitudinal axis perpendicular to the vehicle longitudinal axis. The illustrated embodiment also includes a pair of cameras 240b positioned at or near the vehicle longitudinal axis and oriented to capture a forward looking field of view along a line of sight substantially parallel to the vehicle longitudinal axis.

In exemplary embodiments, the cameras 240b have angle of views, focal lengths, and other attributes that are different from those of one or more other cameras 240b. For example, the cameras 240b on the right and left sides of the vehicle may have an angle of view that is greater than the angle of view associated with the cameras 240b positioned at the front left, front right, rear left, or rear right of the vehicle. In some embodiments, the angle of view of the cameras 240b are chosen so that the field of view of different cameras 240b overlap, at least in part, to ensure camera coverage at particular locations or orientations relative to the vehicle 100.

The lidar devices 240c are also disposed at different locations of the vehicle 100, and in one embodiment, are disposed symmetrically about the longitudinal axis of the vehicle 100 to achieve parallax. Each of the lidar devices 240c may include or incorporate one or more lasers, scanning components, optical arrangements, photodetectors, and other components suitably configured to horizontally and rotatably scan the environment in the vicinity of the vehicle 100 with a particular angular frequency or rotational velocity. For example, in one embodiment, each lidar device 240c is configured to horizontally rotate and scan 360° at a frequency of 10 Hertz (Hz). As used herein, a lidar scan should be understood as referring to a single revolution of a lidar device 240c.

In exemplary embodiments described herein, the frequency or rate at which the cameras 240b capture images is greater than the angular frequency of the lidar devices 240c. For example, in one embodiment, the cameras 240b capture new image data corresponding to their respective field of view at a rate of 30 Hz. Thus, each camera 240b may capture multiple images per lidar scan, and capture the images at different times independent of the orientation of the lidar device 240c or the angular position within the scan. Accordingly, the subject matter described herein selects or otherwise identifies an image from each respective camera 240b that is temporally associated with the lidar point cloud data from a particular lidar scan based on the timestamps of the images captured by that respective camera 240b relative to a sampling time at which the angular position of the lidar scan corresponds to the line of sight of a lidar device 240c being aligned substantially parallel to the bisector (or line of sight) of the angle of view of the respective camera 240b.

With reference now to FIG. 3, in various embodiments, the autonomous vehicle 100 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 100 may be associated with an autonomous vehicle based remote transportation system. FIG. 3 illustrates an exemplary embodiment of an operating environment shown generally at 300 that includes an autonomous vehicle based remote transportation system 352 that is associated with one or more autonomous vehicles 100a-100n as described with regard to FIG. 1. In various embodiments, the operating environment 300 further includes one or more user devices 354 that communicate with the autonomous vehicle 100 and/or the remote transportation system 352 via a communication network 356.

The communication network 356 supports communication as needed between devices, systems, and components supported by the operating environment 300 (e.g., via tangible communication links and/or wireless communication links). For example, the communication network 356 can include a wireless carrier system 360 such as a cellular telephone system that includes a plurality of cell towers (not shown), one or more mobile switching centers (MSCs) (not shown), as well as any other networking components required to connect the wireless carrier system 360 with a land communications system. Each cell tower includes sending and receiving antennas and a base station, with the base stations from different cell towers being connected to the MSC either directly or via intermediary equipment such as a base station controller. The wireless carrier system 360 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 360. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 360, a second wireless carrier system in the form of a satellite communication system 364 can be included to provide uni-directional or bi-directional communication with the autonomous vehicles 100a-100n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 100 and the station. The satellite telephony can be utilized either in addition to or in lieu of the wireless carrier system 360.

A land communication system 362 may further be included that is a conventional land-based telecommunications network connected to one or more landline telephones and connects the wireless carrier system 360 to the remote transportation system 352. For example, the land communication system 362 may include a public switched telephone network (PSTN) such as that used to provide hardwired telephony, packet-switched data communications, and the Internet infrastructure. One or more segments of the land communication system 362 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 352 need not be connected via the land communication system 362, but can include wireless telephony equipment so that it can communicate directly with a wireless network, such as the wireless carrier system 360.

Although only one user device 354 is shown in FIG. 3, embodiments of the operating environment 300 can support any number of user devices 354, including multiple user devices 354 owned, operated, or otherwise used by one person. Each user device 354 supported by the operating environment 300 may be implemented using any suitable hardware platform. In this regard, the user device 354 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 354 supported by the operating environment 300 is realized as a computer-implemented or computer-based device having the hardware, software, firmware, and/or processing logic needed to carry out the various techniques and methodologies described herein. The user device 354 can include computer processing capability, a transceiver capable of communicating using a short-range wireless protocol, and a visual display. For example, the user device 354 includes a microprocessor in the form of a programmable device that includes one or more instructions stored in an internal memory structure and applied to receive binary input to create binary output. In some embodiments, the user device 354 includes a GPS module capable of receiving GPS satellite signals and generating GPS coordinates based on those signals. In other embodiments, the user device 354 includes cellular communications functionality such that the device carries out voice and/or data communications over the communication network 356 using one or more cellular communications protocols, as are discussed herein. In various embodiments, the user device 354 includes a visual display, such as a touch-screen graphical display, or other display.

The remote transportation system 352 includes one or more backend server systems, which may be cloud-based, network-based, or resident at the particular campus or geographical location serviced by the remote transportation system 352. The remote transportation system 352 can be manned by a live advisor, or an automated advisor, or a combination of both. The remote transportation system 352 can communicate with the user devices 354 and the autonomous vehicles 100a-100n to schedule rides, dispatch autonomous vehicles 100a-100n, and the like. In various embodiments, the remote transportation system 352 stores account information such as subscriber authentication information, vehicle identifiers, profile records, behavioral patterns, and other pertinent subscriber information.

In accordance with a typical use case workflow, a registered user of the remote transportation system 352 can create a ride request via the user device 354. The ride request will typically indicate the passenger's desired pickup location (or current GPS location), the desired destination location (which may identify a predefined vehicle stop and/or a user-specified passenger destination), and a pickup time. The remote transportation system 352 receives the ride request, processes the request, and dispatches a selected one of the autonomous vehicles 100a-100n (when and if one is available) to pick up the passenger at the designated pickup location and at the appropriate time. The remote transportation system 352 can also generate and send a suitably configured confirmation message or notification to the user device 354, to let the passenger know that a vehicle is on the way.

As can be appreciated, the subject matter disclosed herein provides certain enhanced features and functionality to what may be considered as a standard or baseline autonomous vehicle 100 and/or an autonomous vehicle based remote transportation system 352. To this end, an autonomous vehicle and autonomous vehicle based remote transportation system can be modified, enhanced, or otherwise supplemented to provide the additional features described in more detail below.

Figure 4:
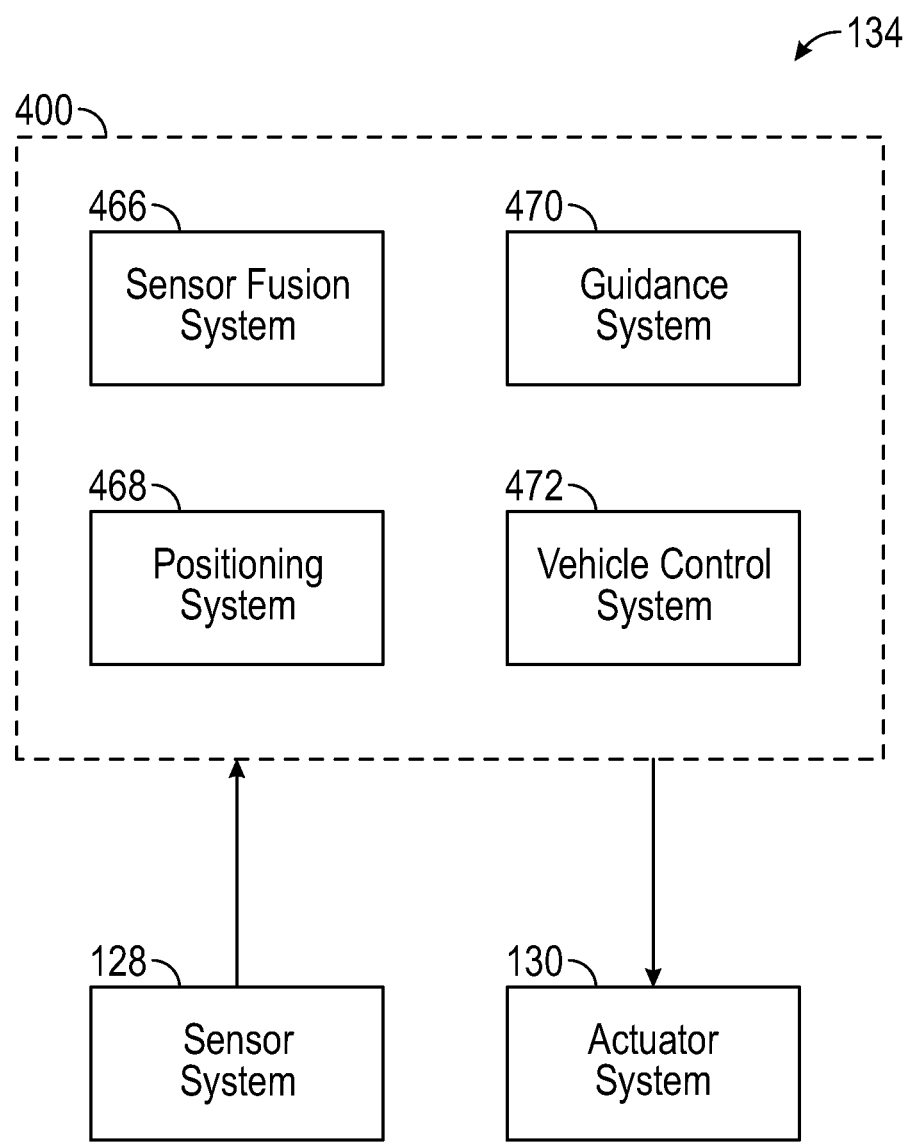
FIG. 4 is a dataflow diagram that illustrates an autonomous driving system (ADS) in accordance with various embodiments of the present disclosure.

Referring now to FIG. 4, and with continued reference to FIG. 1, in accordance with various embodiments, controller 134 implements an autonomous driving system (ADS) 400 as shown in FIG. 4. That is, suitable software and/or hardware components of controller 134 (e.g., processor 144 and computer-readable storage device 146) are utilized to provide an autonomous driving system 400 that is used in conjunction with vehicle 100.

In various embodiments, the instructions of the autonomous driving system 400 may be organized by function or system. For example, as shown in FIG. 4, the autonomous driving system 400 can include a sensor fusion system 466, a positioning system 468, a guidance system 470, and a vehicle control system 472. As can be appreciated, in various embodiments, the instructions may be organized into any number of systems (e.g., combined, further partitioned, etc.) as the disclosure is not limited to the present examples.

In various embodiments, the sensor fusion system 466 synthesizes and processes sensor data and predicts the presence, location, classification, and/or path of objects and features of the environment of the vehicle 100. In various embodiments, the sensor fusion system 466 can incorporate information from multiple sensors, including but not limited to cameras, lidars, radars, and/or any number of other types of sensors.

The positioning system 468 processes sensor data along with other data to determine a position (e.g., a local position relative to a map, an exact position relative to lane of a road, vehicle heading, velocity, etc.) of the vehicle 100 relative to the environment. The guidance system 470 processes sensor data along with other data to determine a path for the vehicle 100 to follow. The vehicle control system 472 generates control signals for controlling the vehicle 100 according to the determined path.

In various embodiments, the controller 134 implements machine learning techniques to assist the functionality of the controller 134, such as feature detection/classification, obstruction mitigation, route traversal, mapping, sensor integration, ground-truth determination, and the like.

As mentioned briefly above, the autonomous driving system 400, can be included within the vehicle of FIG. 1.

An example of the sensor fusion system 466 in accordance with the disclosed embodiments will now be described in more detail with regard to FIGS. 5 and 6 with continued reference to FIGS. 1-4.

Figure 5:
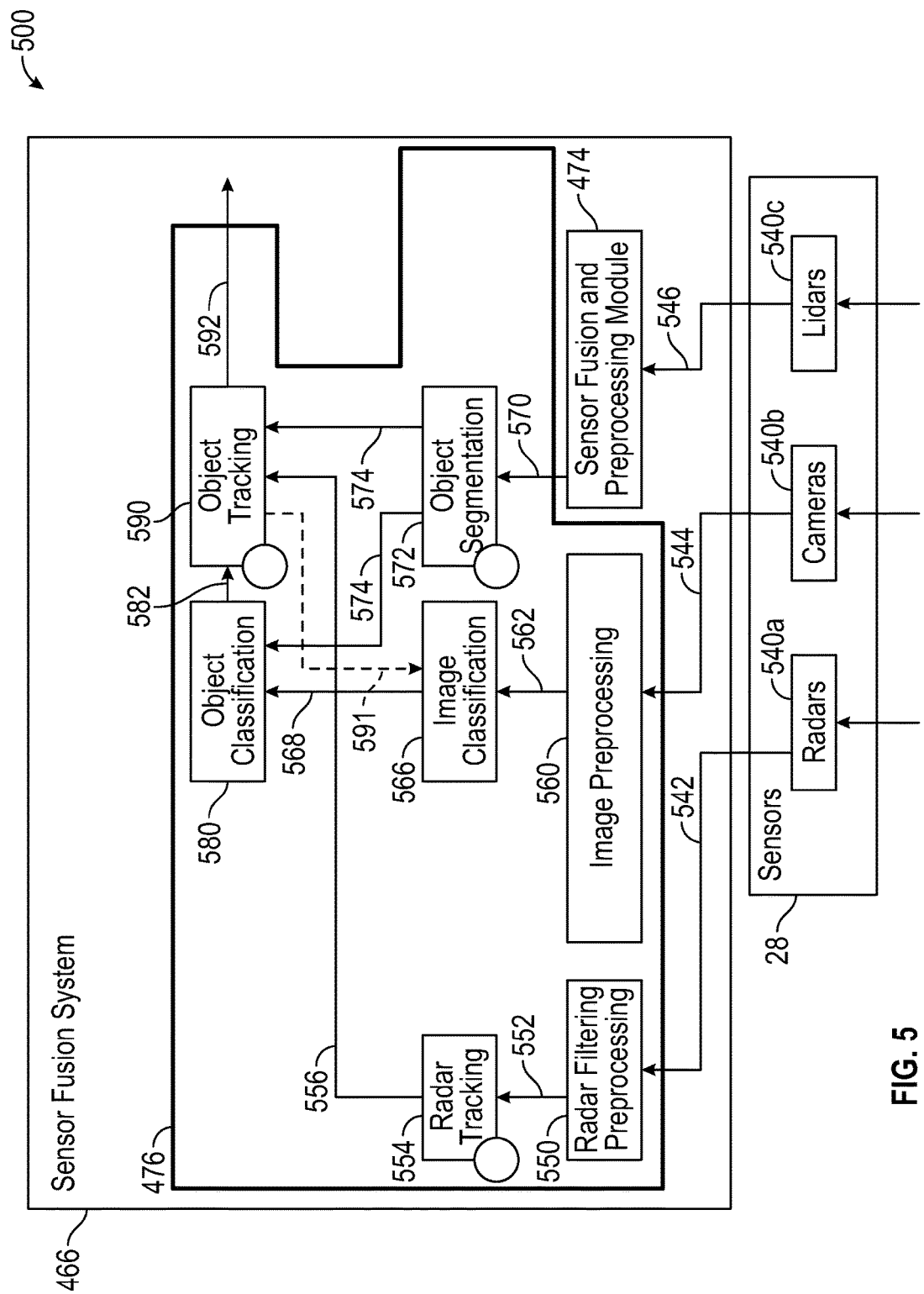
FIG. 5 is a block diagram that illustrates a sensor fusion system of the ADS in accordance with various embodiments of the present disclosure.

As illustrated in FIG. 5, the sensors include radar devices 546a, cameras 546b, and lidar devices 546c. In various embodiments, the sensor fusion system 466 includes a sensor fusion and preprocessing module 474 and a classification and segmentation module 476.

Each of the radar devices 546a processes electromagnetic waves reflected from objects to generate radar data 542 that indicates the presence, direction, distance, and speed of objects within the field of view. The radar filtering and preprocessing module 550 receives radar data 542 and processes it to generate preprocessed radar data 552. The radar filtering and preprocessing module 550 can pre-process the radar data 542 to remove things like stationary objects, objects in undriveable areas (like radar returns from buildings) and noisy measurements/interference (e.g., due to velocity). The radar tracking 554 receives the preprocessed radar data 552 and processes it to generate the radar tracking information 556, which is sent to the object tracking module 590.

The cameras 546b (or image sensors) are spaced to provide three-hundred and sixty (360) degree image coverage of the environment surrounding the vehicle 100. The cameras 546b capture images (e.g., image frames) and output image data 544. The image data 544 is a distorted, YUV format image.

The image preprocessing module 560 receives the image data 544 and processes it to generate rectified (or undistorted) camera images 562. The image preprocessing module 560 processes the image data 544, by undistorting/rectifying it, preprocessing the rectified image data 544 (e.g., image resizing and mean subtraction), and converting the rectified, pre-processed image data into rectified camera images 562 (e.g., having a normal RGB format) that the neural network of the image classification module 566 can classify. The image data 544 can be rectified to correct distortions in the image can cause lines that are straight in reality to appear curved: if point clouds in 3D space were projected onto the unrectified image data, they might actually be in the wrong place in the image because of the distortions. By rectifying the image, the projections from 3D space correspond to the correct parts of the image.

The rectified camera images 562 are sent to the image classification module 566. The image classification module 566 receives the rectified camera images 562 along with other inputs including the three-dimensional locations of objects 591 from the object tracking module 590.

The image classification module 566 processes the rectified camera images 562 and the three-dimensional locations of objects 591 from the object tracking module 590 to generate the image classification data 568, and provides the image classification data 568 to the object classification module 580. Based on objects 574 from the object segmentation module 572 and the image classification data 568, the object classification module 580 generates the object classification data 582 which is sent to the object tracking module 590. The object tracking module 590 processes the objects 574, the radar tracking information 556, and the object classification data 582 to generate object tracking information 592.

The lidar devices 546c perform a scan by illuminating that target with pulses of laser light, and measure distance to a target by receiving reflected pulses back. The intensity of the reflected pulses can be collectively used by the lidar devices 546c to generate a lidar point cloud that represents the spatial structure/characteristics of objects within the field of view. In one embodiment, the lidar devices 546c use rotating laser beams that rotate to scan three-hundred and sixty (360) degrees around the vehicle. In another embodiment, the lidar devices 546c oscillate back and forth at a certain scan frequency (i.e., how fast they oscillate). The rate at which the lidar devices 546c pulse in KHz can be referred to as a repetition rate. For example, if the pulse rate is 100 KHz, then the laser will pulse 100,000 times a second and will receive information back from the pulses in this time.

Each of the lidar devices 546c receive lidar data and process the lidar data (e.g., packets of lidar return information) to generate a lidar point cloud 546. Each point cloud 546 is a three-dimensional set of points in a three-hundred and sixty (360) degree zone around the vehicle. Each point has intensity data in addition to a three-dimensional XYZ location. In one embodiment, the point cloud 546 includes a first, intermediate and last returned from each laser pulse. In one embodiment, two lidar devices 546c are utilized. The lidar devices 546c are synchronized together (or phase-locked).

In addition, it is noted that in one embodiment, the cameras 546b are run at their maximum frame rate. The refresh rate of the cameras 546b is much higher than the lidar devices 546c. As lidar spins clockwise from the back of the car, each camera captures images in a clockwise order during the lidar device's rotation. An extrinsic calibration procedure provides information regarding where the cameras are pointing. The lidar devices are phase locked (i.e., scheduled to be in a certain rotational positions at certain times) so it is known when the lidar devices scan certain parts of their cycle. For analysis of a scene, the system can determine which imager/camera 546b is aligned at a point in time when certain lidar data was acquired. The system can the select whatever image was sampled/obtained closest to the point in time during which the lidar data was acquired such that only images that were captured near a certain target time (i.e., when the lidar device is looking at the same region that a camera is pointing) will be processed. As a result, camera-lidar pairs with excellent alignment can be determined. This gives lidar data at a certain heading/orientation along with corresponding image data for the scene/environment at that heading/orientation.

The sensor fusion and preprocessing module 474 fuses together the lidar data of the two lidar point clouds acquired by the two lidar devices 546c into a single lidar point cloud 546, and performs three-dimensional point sampling to pre-process the lidar data (of the single lidar pointcloud 546) to generate a set of three-dimensional points 570.

The object segmentation module 572 receives the set of three-dimensional points 570 and segments them into objects 574. The objects 574 are sent to the object classification module 580 and the object tracking module 590. The object classification module 580 includes multiple classifiers that classifies the objects 574 and the image classification data 568 to generate the object classification data 582. The object tracking module 590 includes a tracking pipeline that tracks the objects 574, and used along with the radar tracking information 556 and the object classification data 582 to generate the object tracking information 592. The object tracking information 592 can include temporal tracking information for objects such as location, geometry, speed, etc. of objects in the environment.

Figure 6:
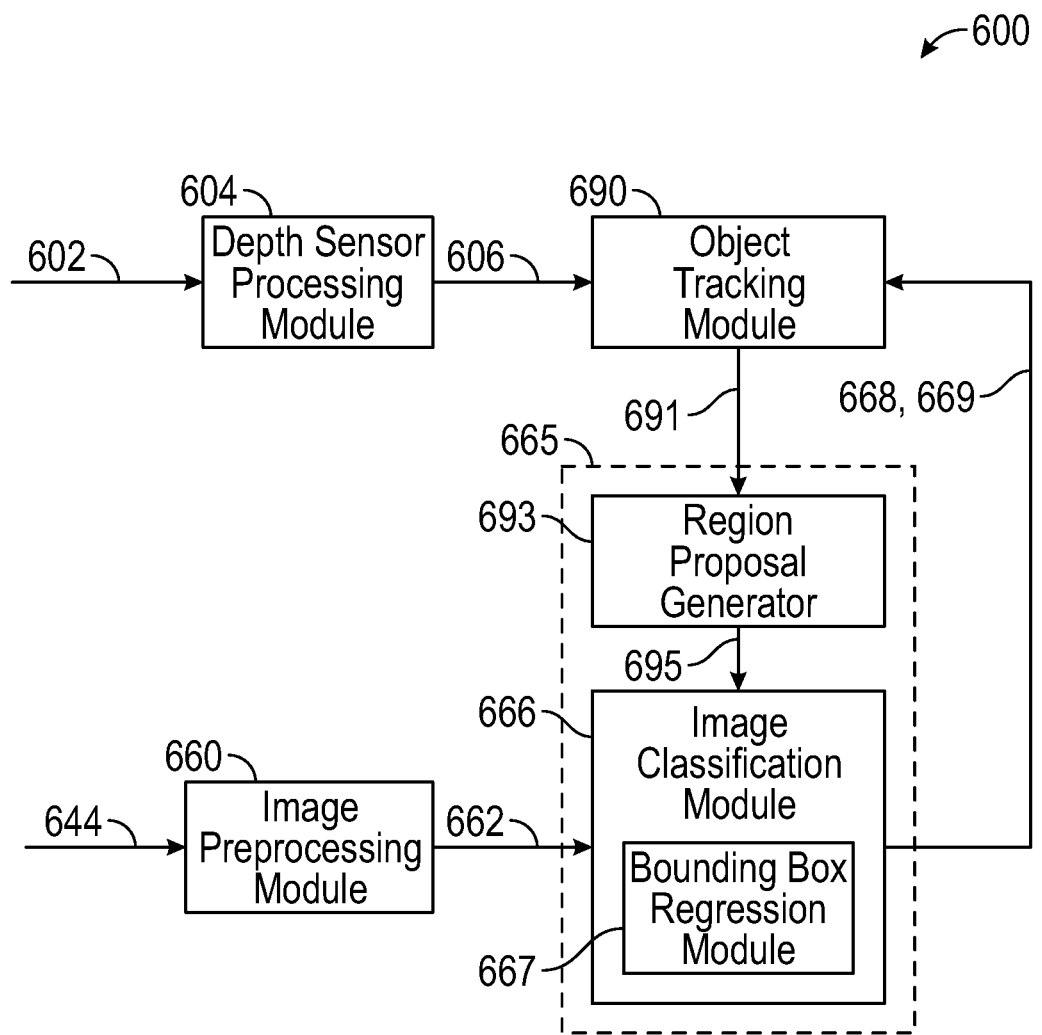
FIG. 6 illustrates a visual classification system in accordance with various embodiments of the present disclosure.

FIG. 6 illustrates a visual classification system 600 in accordance with various embodiments. The visual classification system 600 can be implemented as part of the classification and segmentation module 476 of the sensor fusion system 132 illustrated in FIGS. 4 and 5. As illustrated in FIG. 6, the visual classification system 600 includes an image preprocessing module 660, an image classification module 666, and an object tracking module 690 that are similar to the image preprocessing module 560, the image classification module 566, and the object tracking module 590 described above with respect to FIG. 5. In addition, the visual classification system 600 also includes a depth sensor processing module 602 and a region proposal generator module 693. The descriptions of image preprocessing module 560, the image classification module 566, and the object tracking module 590 from FIG. 5 will not be repeated here, but are applicable to the image preprocessing module 660, the image classification module 666, and the object tracking module 690 of FIG. 6. FIG. 6 will be described with reference to FIGS. 1-5.

The depth sensor processing module 604 generates segmented objects 606. Depending on the implementation, the depth sensor processing module 604 can generate segmented objects 606 based on different inputs. For example, the depth sensor processing module 604 can process one or more of radar data 542 from the radar devices 546a, point cloud data 546 from the lidar devices 546c of FIG. 5, stereo vision data from cameras that provides relative depth information, and/or structured-light ranging data from a stereo vision system to generate the segmented objects 606. The segmented objects 606 define locations and dimensions of objects. In one embodiment, the inputs to the depth sensor processing module 604 can include a large lidar point cloud that gives positions of points relative to the sensor. The outputs from the depth sensor processing module 604 can include coordinates of each object. Position of the car and the lidar provides positions of points relative to the sensor and three-dimensional locations of objects. A convex hull drawn around each object's points can provide a rough size/geometry for each object.

In one embodiment, the depth sensor processing module 604 receives radar and/or lidar data 602 (e.g., the radar data 542 from the radar devices 546a and/or the point cloud data 546 from the lidar devices 546c of FIG. 5), and processes the radar and/or lidar data 602 to generate segmented objects 606. During the process of generating the segmented objects 606, the depth sensor processing module 604 uses the radar data and/or lidar data 602 to generate other intermediate data (e.g., that was pre-processed by other modules of FIG. 5) that can then be used to generate the segmented objects 606. The depth sensor processing module 604 can also filter information from the radar data and/or lidar data 602 to disregard any objects should not be tracked. These include objects that the vehicle could not possibly hit (e.g., overly high objects such as trees overhanging the road, objects not in an area of interest such as buildings in an undriveable area, and very low objects such as trash or debris on the road, objects that are too small/far away to classify (e.g., very distant thin objects or fast-flying birds), etc.

The object tracking system 690 uses the segmented objects 606 to track the three-dimensional location of objects in the vicinity of the vehicle. The object tracking module 690 keeps track of objects within driveable area of interest and above the ground by a certain height in a three-hundred and sixty (360) degree space around the vehicle. The cameras 546*b* have a more limited field of view.

In one embodiment, the object tracking module 690 generates state information 691. State information 691 can be generated based on the segmented objects 606 (and the object classification results 668 and regressed bounding boxes 669 that are fed back to the object tracking module 690). The state information 691 includes fine details of object characteristics including object geometry (dimensions) and object position with respect to the vehicle. For example, in one embodiment, the state information 691 provided by the object tracking module 690 includes: smoothed three-dimensional locations of objects, distance/depth of the object from the vehicle, dimensions and shapes of the objects, velocity of the objects, and classifications of objects assembled from historical information. It should be noted that the region proposal generator 693 and image classification module 666 disregard the classifications provided from the object tracking module 690.

The image preprocessing module 660 receives the image data 644 from the cameras 546*b* (FIG. 5), and processes the image data 644 to generate the rectified camera images 662. The image classification system 665 includes a region proposal generator module 693 and an image classification module 666.

The region proposal generator module 693 processes the object state information 691 including the three-dimensional locations of objects (received from the object tracking module 690), and generates bounding box region proposals 695. The bounding box region proposals 695 are selected areas of the camera images that include objects that need to be classified via image analysis using neural networks. The bounding box region proposals 695 are two-dimensional bounding box coordinates in the rectified camera images 662. Each set of two-dimensional bounding box coordinates corresponds to a region of the rectified camera images 662 that includes one or more objects that need to be classified.

For example, in one embodiment, the region proposal generator module 693 takes in the object state information 691 (including the three-dimensional locations of objects) received from the object tracking module 690, and translates the three-dimensional locations of the objects into bounding box region proposals 695. The locations and field of views of each camera on the vehicle can be determined by extrinsic calibration of each camera. The translation can be done, for example, by using the three-dimensional locations of objects and extrinsic calibration of the camera to the chassis to determine which objects are in the image and where in the image they are (as described by a bounding box in the image). Camera frames are captured when the lidar scans over the field of view that the camera sees so that the camera frames are synchronized to the lidar scans. The three-dimensional locations of the objects can then be projected into the image.

Objects of interest can then be classified. In general, these objects will be anything in the image that is a certain height range above the ground (e.g., between 20 centimeters and four meters above the ground) and meets a size constraint (e.g., the objects must have a longest side of their bounding box region proposals 695 that is at least 30 pixels in the projected image in the image in order to be classified). This height range can be determined using height map information that specifies upper and lower boundaries for objects. This way only the objects that are of significance will be classified as opposed to, for example, things that are too small (e.g., the longer side of the object is less than 30 pixels) or inconsequential (e.g., the ground, overly high objects such as trees overhanging the road, objects not in an area of interest such as buildings in an undriveable area, and very low objects such as trash or debris on the road, etc.)

The image classification module 666 processes certain regions of the rectified camera images 662 using a neural network. The neural network is a convolutional neural network trained on a set of labelled image data. Essentially, given labelled image data, the neural network learns features or characteristics for each type of object. An image may contain people, cars, bikes, etc. The labelled image data consists of labelled images that are annotated with the bounding boxes of objects and the class of these objects. The neural network trains on these labelled images until it achieves satisfactory performance, at which point it is able to classify objects in images that are not in the set of labelled image data.

In one embodiment, the neural network is run on a GPU. The neural network receives the rectified camera images 662 from the image preprocessing module 660 and set of bounding box region proposals 695 from the region proposal generator module 693, classifies only the objects within the bounding box region proposals 695 on the GPU, and returns, for each object, a classification result 668 for each of the bounding box region proposals 695 and a regressed bounding box 669. Notably, the image classification module 666 only analyzes the portions of the rectified camera images 662 that correspond to (or are specified in) the bounding box region proposals 695 to classify objects that are within those regions of the rectified camera images 662 (e.g., determine what the objects are based on image data for those regions of the rectified camera images 662). Thus, instead of having to search the entire image for objects of interest that need to be classified, the image classification module 666 only classifies objects that correspond to the bounding box region proposals 695 (i.e., certain portions of the rectified camera images 662 instead of the entire image). This process of classifying objects is much faster and consumes less computing resources.

The image classification module 666 includes a bounding box regression module 667 that generates a regressed bounding box 669. Each regressed bounding box 669 reflects what the neural network determines is the best bounding box encompassing the object. Thus, for each set of two-dimensional bounding box coordinates specified in the bounding box region proposals 695, the bounding box regression module 667 generates an object classification result 668 and a regressed bounding box 669. Each regressed bounding box 669 specifies the dimensions of the object, and the distance to the object (from the initial region proposal's 3D location). For each object, the regressed bounding box 669 is fed back to the object tracking module 690, and can then be used to generate updated state information 691. In one embodiment, spatially perturbed proposals can be generated for each object from the object's initial proposal (generated from projecting the object into the image). The proposal with the highest response from the neural network can then be chosen. In the cases where the region proposals are slightly off (e.g., the height of the object is incorrect), this allows the network to find the best region proposal for a classification.

The visual classification system 600 iteratively performs that processing by feeding back the object classification results 668 and a regressed bounding box 669 for each object. As a result, in each subsequent iteration, the bounding box region proposal 695 for each object can be refined (if needed) so that it more closely matches/describes the actual geometry of each object from the image. As such, if a bounding box region proposals 695 for an object was a little loose around the object, the regressed bounding box 669 will more tightly describes the geometry of the object (as seen from the image).

Figure 7:
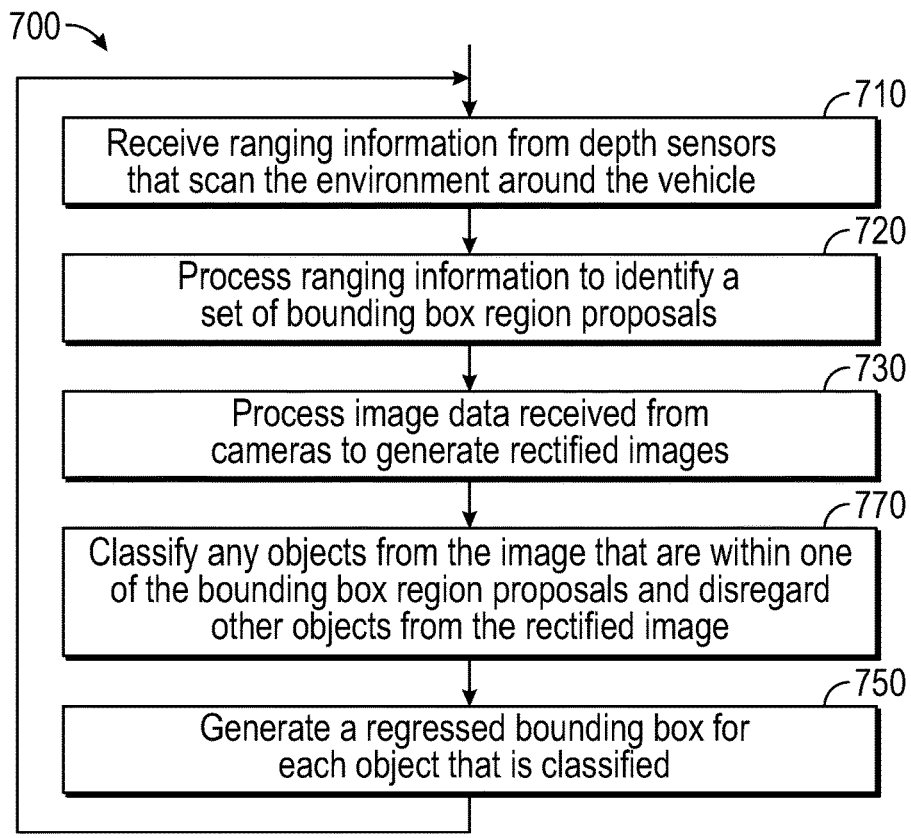
FIG. 7 is a flowchart that illustrates a method for classifying objects in accordance with various embodiments of the present disclosure.

Referring now to FIG. 7, and with continued reference to FIGS. 1-6, a flowchart that illustrates a method 700 for classifying objects that can be performed by the ADS of FIGS. 4 and 5 in accordance with the present disclosure. As can be appreciated in light of the disclosure, the order of operation within the method is not limited to the sequential execution as illustrated in FIG. 7, but may be performed in one or more varying orders as applicable and in accordance with the present disclosure. In various embodiments, the method 700 can be scheduled to run based on one or more predetermined events, and/or can run continuously during operation of the autonomous vehicle 100.

At 710, ranging information is received from depth sensors that scan the environment around the vehicle. The ranging information can include radar data 542 from radar devices 546*a*, and/or point cloud data 546 provided from lidar devices 546*c*. In other embodiments, the ranging information can be obtained from a computer-based stereo vision system that extracts three-dimensional information from digital images obtained via cameras. By comparing images from two cameras that are displaced from each other and have different vantage points, three-dimensional depth information can be extracted by examination of the relative positions of objects. For example, in one embodiment, by comparing these images, the relative depth information can be obtained in the form of a disparity map, which encodes the difference in horizontal coordinates of corresponding image points, and the values in this disparity map are inversely proportional to the scene depth at the corresponding pixel location. In one embodiment, the ranging information can be stereo vision data from cameras (e.g., charge coupled devices) that provide differing views on a scene to provide relative depth information. In other embodiments, the ranging information can be structured-light ranging data obtained from a stereo vision system that utilizes a structured light or laser. For instance, a conventional structured-light vision employs a structured light or laser, and finds projector-camera correspondences, whereas a conventional active stereo vision employs a structured light or laser, but the stereo matching is performed only for camera-camera correspondences, in the same way as the passive stereo vision. Structured-light stereo systems utilize both camera-camera and projector-camera correspondences.

At 720, a Graphics Processing Unit (GPU) processes ranging information from depth sensors to identify a set of bounding box region proposals 695 for an image from a camera. The bounding box region proposals 695 are selected areas of the image that include objects to be classified. In one embodiment, each of the bounding box region proposals 695 comprises a set of two-dimensional bounding box coordinates that correspond to a region of a rectified image 662 that includes one or more objects to be classified. The set of bounding box region proposals 695 collectively specify which objects are in the rectified image 662 and where those objects are in the rectified image 662.

At 730, the image preprocessing module 660, executed at the GPU, can process image data 644 received from cameras 546*b* to generate rectified images 662.

At 740, a neural network executed by the GPU can then classify the objects from the image that are within one of the bounding box region proposals 695. In doing so, the neural network generates an object classification result 668 for each object from the rectified image 662 that is within one of the bounding box region proposals 695. In one embodiment, the neural network executed by the GPU is a convolutional neural network that is trained on a set of labelled image data to learn characteristics for each type of object. The set of labelled image data includes information that identifies a class of each object and labelled images that are each annotated with a bounding box of that object. When executed by the GPU the convolutional neural network only classifies the objects from the rectified image 662 that are within one of the bounding box region proposals 695, and disregards other objects from the rectified image 662. As such, only portions of the rectified image 662 that are specified by one of the bounding box region proposals 695 are analyzed to classify objects within the rectified image 662.

At 750, during classification of the objects, a bounding box regression module 667 executed at the GPU generates a regressed bounding box 669 for each object that is classified. The regressed bounding box for each object is the bounding box that the neural network has determined to be the best bounding box encompassing that object.

The method 700 then loops, back to 710. The steps 710 through 750 are performed iteratively such that an object classification result 668 and a regressed bounding box 669 for each object being classified are fed back on each iteration. As such, the bounding box region proposal 695 for each object can be refined during each subsequent iteration so that the bounding box region proposal 695 for each object more closely describes actual geometry of that object.

Figure 8:
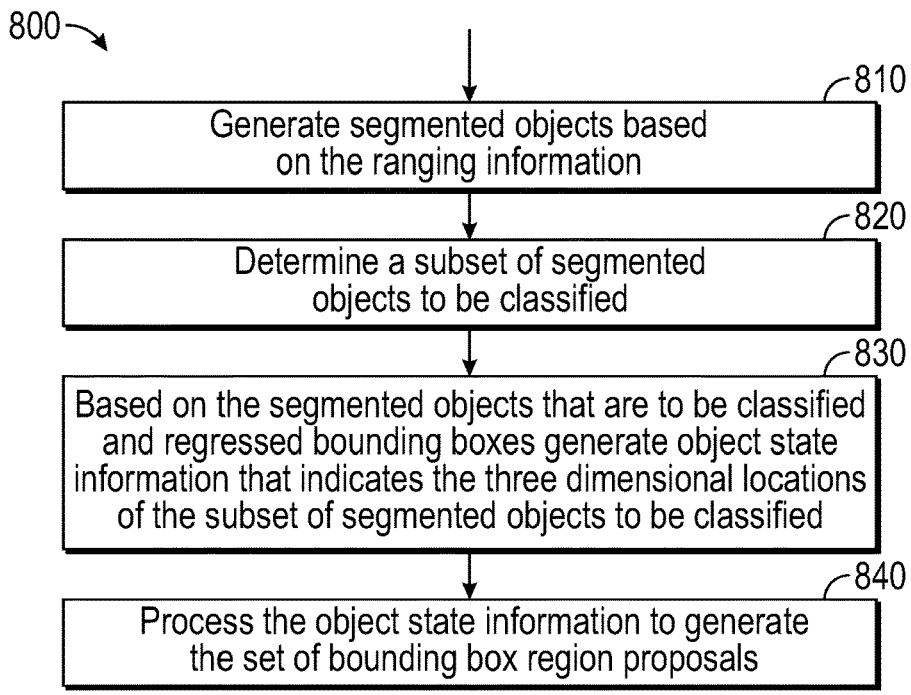
FIG. 8 is a flowchart that illustrates a method for processing ranging information to identify a set of bounding box region proposals in accordance with various embodiments of the present disclosure.

Referring now to FIG. 8, and with continued reference to FIGS. 1-7, a flowchart that illustrates a method 800 for processing ranging information from depth sensors at a Graphics Processing Unit (GPU) to identify a set of bounding box region proposals 695 in accordance with the present disclosure. The method can be performed by the ADS of FIGS. 4 and 5. As can be appreciated in light of the disclosure, the order of operation within the method 800 is not limited to the sequential execution as illustrated in FIG. 8, but may be performed in one or more varying orders as applicable and in accordance with the present disclosure. In various embodiments, the method 800 can be scheduled to run based on one or more predetermined events, and/or can run continuously during operation of the autonomous vehicle 100.

In one embodiment, processing the range information starts at 810, where the depth sensor processing module 604 executed at the GPU, generates segmented objects 606 based on the ranging information. The segmented objects 606 define three-dimensional locations and dimensions of objects in vicinity of a vehicle.

At 820, the object tracking module 690 can determine a subset of segmented objects 606 to be classified. The subset of segmented objects 606 to be classified are those segmented objects that: meet a size constraint, are within a certain height range above the ground and are within a driveable area of the vehicle. Other segmented objects that are not to be classified are those that the vehicle cannot hit and are disregarded during subsequent steps.

At 830, the object tracking module 690 generates object state information that indicates the three-dimensional locations of the subset of segmented objects to be classified. In one embodiment, the object state information can be generated based on the segmented objects 606 that are to be classified and regressed bounding boxes 669 that are fed back to the object tracking module 690. In one embodiment, the object state information 691 for each object comprises dimensions and shape of that object, velocity of the object, and a three-dimensional location of that object with respect to the vehicle that indicates distance of that object from the vehicle.

At 840, the region proposal generator module 693 executed at the GPU can then process the object state information 691 to generate the set of bounding box region proposals 695. The region proposal generator module 693 can translate the three-dimensional locations of objects as specified by the object state information 691 into the set of bounding box region proposals 695. For example, in one implementation, the region proposal generator module 693 can generate bounding box region proposals 695 for each object by projecting the three-dimensional location of that object into one of the rectified images 662 using extrinsic calibrations of the camera to the chassis. For example, one or more cameras can be spatially calibrated to the lidar devices (e.g., where the camera is mounted relative to the lidar to temporally calibrate the cameras to the lidar such that only the frames are captured when the lidar scans over its field of view). This information can then be used when three-dimensional objects are projected into a camera frame.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for classifying objects in an environment, the method comprising:
   (a) processing, ranging information from depth sensors to identify a set of bounding box region proposals for an image from a camera, wherein the ranging information comprises point cloud data provided from lidar devices, wherein the bounding box region proposals are selected areas of the image that include objects to be classified, wherein each of the bounding box region proposals comprises: a set of two-dimensional bounding box coordinates that correspond to a region of a rectified image that includes one or more objects to be classified, wherein the set of bounding box region proposals collectively specify which objects are in the rectified image and where those objects are in the rectified image, wherein the processing comprises:
   (a1) generating segmented objects based on the ranging information, wherein the segmented objects define three-dimensional locations and dimensions of objects in vicinity of a vehicle;
   (a2) determining a subset of segmented objects to be classified that: meet a size constraint, are within a certain height range above the ground and are within a driveable area of the vehicle, and wherein other segmented objects that are not to be classified are those that the vehicle cannot hit and are disregarded when generating the object state information;
   (a3) generating object state information that indicates the three-dimensional locations of the subset of segmented objects to be classified; and
   (a4) translating the three-dimensional locations of objects as specified by the object state information into the set of bounding box region proposal; and
   (b) classifying, via a neural network executed by the hardware based processor, only the objects from the image that are within one of the bounding box region proposals and generating an object classification result for each object from the rectified image that is within one of the bounding box region proposals;
   (c) processing image data received from cameras to generate the rectified images; and
   (d) generating a regressed bounding box for each object that is classified, wherein each regressed bounding box for each object is the bounding box that the neural network has determined to be a best bounding box encompassing that object, wherein steps (a1) through (a4), (b), (c) and (d) are performed iteratively such that the object classification result and the regressed bounding box for each object being classified are fed back on each iteration to refine the bounding box region proposal for each object during each subsequent iteration so that the bounding box region proposal for each object more closely describes actual geometry of that object.

2. The method according to claim 1, wherein processing the object state information to generate the set of bounding box region proposals:
   for each object:
   projecting the three-dimensional location of that object relative to the vehicle into one of the rectified images.

3. The method according to claim 1, wherein the ranging information further comprises at least one of:
   radar data from radar devices;
   stereo vision data from cameras that provides relative depth information; and
   structured-light ranging data from a stereo vision system.

4. A classification system for classifying objects in an environment, the classification system comprising:
   a hardware-based processor: and
   memory comprising processor-executable instructions encoded on a non-transient processor-readable media, wherein the hardware-based processor is configurable to execute the processor-executable instructions to:
   generate segmented objects based on ranging information, wherein the ranging information comprises point cloud data provided from lidar devices, wherein the segmented objects define three-dimensional locations and dimensions of objects in vicinity of a vehicle;
   determine a subset of segmented objects to be classified that meet a size constraint based, are within a certain height range above the ground and are within a driveable area of the vehicle, wherein other segmented objects that are not to be classified are those that the vehicle cannot hit and are disregarded when generating the object state information; and generate object state information that indicates the three-dimensional locations of the subset of segmented objects with respect to the vehicle;
   translate the three-dimensional locations of objects as specified by the object state information into a set of bounding box region proposals for an image from a camera, wherein the bounding box region proposals are selected areas of the image that include objects to be classified, wherein each of the bounding box region proposals comprises: a set of two-dimensional bounding box coordinates that correspond to a region of a rectified image that includes one or more objects to be classified, and wherein the set of bounding box region proposals collectively specify which objects are in the rectified image and where those objects are in the rectified image;

classify, via a neural network executed by the hardware based processor, only the objects from the rectified image that are within one of the bounding box region proposals and to disregard other objects from the rectified image such that only portions of the rectified image that are specified by one of the bounding box region proposals are analyzed to classify objects within the rectified image; and generate an object classification result for each object from the rectified image that is within one of the bounding box region proposals; and generate a regressed bounding box for each object that is classified, wherein each regressed bounding box for each object is the bounding box that the neural network has determined to be a best bounding box encompassing that object, wherein the object classification result and the regressed bounding box for each object being classified are fed back iteratively to refine the bounding box region proposal for each object during each subsequent iteration so that the bounding box region proposal for each object more closely describes actual geometry of that object.

5. An autonomous vehicle, comprising: a camera configured to capture an image; a controller comprising:

an autonomous driving system (ADS), comprising:

a classification system for classifying objects in an environment within a driveable area of the autonomous vehicle, the classification system comprising:

memory comprising processor-executable instructions encoded on a non-transient processor-readable media: and a hardware-based processor to execute the processor-executable instructions to:

generate segmented objects based on ranging information, wherein the ranging information comprises point cloud data provided from lidar devices, wherein the segmented objects define three-dimensional locations and dimensions of objects in vicinity of the autonomous vehicle;

determine a subset of segmented objects to be classified that meet a size constraint based, are within a certain height range above the ground and are within a driveable area of the vehicle, wherein other segmented objects that are not to be classified are those that the vehicle cannot hit and are disregarded when generating the object state information;

generate object state information that indicates the three-dimensional locations of the subset of segmented objects with respect to the vehicle;

translate the three-dimensional locations of objects as specified by the object state information into a set of bounding box region proposals for the image, wherein the bounding box region proposals are selected areas of the image that include objects to be classified, wherein each of the bounding box region proposals comprises: a set of two-dimensional bounding box coordinates that correspond to a region of a rectified image that includes one or more objects to be classified, and wherein the set of bounding box region proposals collectively specify which objects are in the rectified image and where those objects are in the rectified image;

process image data received from cameras to generate the rectified images;

classify, via a neural network executed by the hardware based processor, only the objects from the rectified image that are within one of the bounding box region proposals and to disregard other objects from the rectified image such that only portions of the rectified image that are specified by one of the bounding box region proposals are analyzed to classify objects within the rectified image;

generate an object classification result for each object from the rectified image that is within one of the bounding box region proposals; and generate a regressed bounding box for each object that is classified, wherein each regressed bounding box for each object is the bounding box that the neural network has determined to be a best bounding box encompassing that object, wherein the object classification result and the regressed bounding box for each object being classified are fed back iteratively to refine the bounding box region proposal for each object during each subsequent iteration so that the bounding box region proposal for each object more closely describes actual geometry of that object.

* * * * *